(12) United States Patent
Takada et al.

(10) Patent No.: US 7,802,890 B2
(45) Date of Patent: Sep. 28, 2010

(54) LIGHT SOURCE DEVICE AND PROJECTOR

(75) Inventors: Yutaka Takada, Minami-Minowa-Mura (JP); Hiroyuki Moteki, Siojiri (JP)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 12/023,353

(22) Filed: Jan. 31, 2008

(65) Prior Publication Data
US 2008/0186457 A1 Aug. 7, 2008

(30) Foreign Application Priority Data
Feb. 2, 2007 (JP) ............................. 2007-023822

(51) Int. Cl.
*G03B 21/28* (2006.01)
(52) U.S. Cl. ..................... 353/98; 353/119; 313/609
(58) Field of Classification Search .................. 353/98, 353/119; 313/609, 611, 634; 315/344
See application file for complete search history.

(56) References Cited
U.S. PATENT DOCUMENTS
2008/0203883 A1* 8/2008 Takada et al. ............... 313/153
2010/0096569 A1* 4/2010 Nguyen et al. ............ 250/505.1

FOREIGN PATENT DOCUMENTS

| JP | A-58-194242 | 11/1983 |
| JP | A-08-315614 | 11/1996 |
| JP | A-2002-164188 | 6/2002 |
| JP | A-2006-128075 | 5/2006 |
| JP | A-2007-95452 | 4/2007 |
| JP | A-2007-127682 | 5/2007 |
| JP | A-2007-193953 | 8/2007 |
| JP | A-2007-194011 | 8/2007 |

* cited by examiner

*Primary Examiner*—Kevin Pyo
(74) *Attorney, Agent, or Firm*—Oliff & Berridge, PLC

(57) ABSTRACT

A light source device includes a microwave generating section for generating a microwave, a reflector connected to the microwave generating section, and a microwave electrodeless lamp disposed inside a cavity, the cavity including the reflector and a metallic chamber covering an opening section of the reflector. The chamber includes a tube member having an opening section for communicating the inside and the outside of the cavity to lead a light flux out of the chamber, and a bore diameter, D of the opening section, a length L of the tube member, a wavelength $\lambda$ of the microwave, and a wavelength $\Lambda$ of the light flux satisfy $\Lambda < D \leq (1/4)\lambda$, $L \geq (1/4)\lambda$, and $D+L = (1/2)\lambda$.

7 Claims, 5 Drawing Sheets

LIGHT SOURCE DEVICE AND PROJECTOR

BACKGROUND

1. Technical Field

The present invention relates to a light source device equipped with a microwave electrodeless lamp emitting light by irradiating with a microwave and a projector equipped with the light source device.

2. Related Art

Projectors for projecting picture information or an image corresponding to a picture signal are frequently used for presentations or theaters. It is expected for a light source for these projectors to light quickly, to assure stable and high intensity, to be adjusted in the intensity without changing the emission spectrum, and, to have a long-life lamp for rapidly obtaining a bright projection picture. As such a light source, a light source device using a microwave electrodeless lamp has been proposed.

In the light source device using the microwave electrodeless lamp, a light flux and an intense electric field caused by the microwave coexist inside a microwave cavity in which the microwave electrodeless lamp is disposed. As a light source device, it is required to efficiently emit a light flux, and further prevent emission of the microwave energy in consideration of energy efficiency or safety.

Therefore, there is known a light source device having an electrodeless discharge lamp disposed inside a microwave cavity composed of a feeding opening from which a microwave is introduced, a cavity wall having an opening in at least a part thereof, and a meshed metal plate covering the opening, thus preventing emission of the microwave by the meshed metal section and transmitting the light flux through the opening sections of the meshed metal (see e.g., JP-A-58-194242, pp. 2, FIG. 2 (hereinafter Document 1).

Further, there is also known a microwave electrodeless discharge lamp device having a metallic tube member provided to a microwave resonator so as to project therefrom having one end opened inside the microwave resonator and the other end opened outside the microwave resonator, thus the tube member prevents emission of the microwave energy, and transmits a light flux emitted from the bulb (lamp) to lead the light flux outside the microwave resonator (see e.g., JP-A-2002-164188, pp. 4, FIGS. 1, 2 (hereinafter Document 2)).

According to the Document 1 described above, since there is a light flux reflected by the meshed metal section, a problem of deterioration of the light efficiency arises. Further, it is projected that the meshed metal is heated by the heat radiation from the electrodeless discharge lamp, thus the structural strength of the meshed metal is weakened.

Further, according to the Document 2, the length of the tube member necessary for preventing emission of the microwave is defined to be six times as large as the cross-sectional area of the opening section of the tube member. By increasing the length of the tube member, there arises a problem of increasing the optical, loss in the tube member to decrease the light efficiency.

SUMMARY

An advantage of the invention is to provide a light source device capable of improving the light efficiency while preventing leakage of a microwave from a light emitting section, and a projector provided with the light source device.

A light source device according to an aspect of the invention includes a microwave generating section for generating a microwave, a reflector connected to the microwave generating section, and a microwave electrodeless lamp disposed inside a cavity, the cavity including the reflector and a metallic chamber covering an opening section of the reflector, the chamber including a tube member having an opening section for communicating the inside and the outside of the cavity to lead a light flux out of the chamber, and a bore diameter D of the opening section, a length L of the tube member, a wavelength $\lambda$ of the microwave, and a wavelength $\Lambda$ of the light flux satisfying $\Lambda < D \leq (1/4)\lambda$, $L \geq (1/4)\lambda$, and $D+T=(1/2)$.

Further, it is preferable that the bore diameter D of the opening section is equal to $(1/4)\lambda$, and the length L of the tube member is equal to $(1/4)\lambda$.

According to this aspect of the invention, the tube member communicating the inside and outside of the cavity is provided to the chamber, and the bore diameter D of the opening section of the tube member is set to satisfy $\Lambda < D$, thus the light flux emitted from the microwave electrodeless lamp is led from the tube member to the outside of the cavity to satisfy $D \leq (1/4)\lambda$, thereby the intense electric field caused by the microwave, namely emission of the microwave energy can be prevented.

Further, since the length L of the tube member is set to satisfy $L \geq (1/4)\lambda$, and further $D+L=(1/2)\lambda$, the length L becomes $L=(1/2)\lambda$ at a maximum, thus the optical loss of the light flux from the microwave electrodeless lamp led out through the tube member is reduced and the light source device with high light efficiency can be realized.

Further, since no light flux reflected by the meshed metal section exists in contrast to the structure using the meshed metal as in the Document 1 described above, deterioration of the light efficiency never occurs. Further, there can be obtained an advantage that deterioration in the structural strength of the chamber caused by the heat radiation from the microwave electrodeless lamp is eliminated.

Further, when setting the bore diameter D of the opening section of the tube member to $(1/4)\lambda$ and the length L of the tube member to $(1/4)\lambda$, the electrical equivalent length viewed from the chamber becomes $D+L=(1/2)\lambda$, which is equivalent to the case with a short circuit inserted therein. Therefore, leakage of the microwave to the outside through the tube member can be prevented, thus the light flux can be output with high efficiency.

Further, it is preferable that at least inner surface of the tube member of the chamber is in a mirror surface condition.

The light flux emitted from the microwave electrodeless lamp is led out while being reflected by the inner surface of the tube member. Therefore, by finishing the inner surface of the tube member to be in a mirror surface condition, the optical loss in the reflection can be suppressed.

Further, it is preferable that the tube member is provided with an optical lens on an optical axis of a light flux emitted from the microwave electrodeless lamp.

By thus providing the optical lens to the tube member, the light guiding distance from the light source to the optical lens can be shortened, thus the light efficiency can further be improved. As the optical lens, a condenser lens, a collimating lens, and so on can be adopted, thus the light flux can be collected or parallelized at the light flux exit of the light source device, thereby obtaining an advantage of increasing freedom of designing the optical system.

Further, it is preferable that the optical lens is attached to a tube like lens holder to form an optical lens unit, and the optical lens unit is attached to the tube member.

When collecting or parallelizing the light flux emitted from the microwave electrodeless lamp, there are various combinations of the optical lenses in accordance with purposes. In such a case, by preparing the optical lenses as units, the optical lens units can selectively be used in accordance with the purpose of use.

Further, it is preferable that the optical lens unit is attached movably in the optical axis direction of the light flux emitted from the microwave electrodeless lamp.

By movably attaching the optical lens unit, freedom of setting the focal distance increases, thus instead of providing dedicated light source devices to individual forms of use, it becomes possible to cope with various kinds of forms of use without increasing the number of kinds of light source devices.

Further, a projector according to another aspect of the invention includes a light source device including a microwave generating section for generating a microwave, a reflector connected to the microwave generating section, and a microwave electrodeless lamp disposed inside a cavity, the cavity including the reflector and a chamber covering an opening section of the reflector, the chamber including a tube member having an opening section for communicating the inside and the outside of the cavity to lead a light flux out of the chamber, and a bore diameter D of the opening section, a length L of the tube member, a wavelength $\lambda$ of the microwave, and a wavelength $\Lambda$ of the light flux satisfying $\Lambda<D\leq(\frac{1}{4})\lambda$, $L\geq(\frac{1}{4})\lambda$, and $D+L=(\frac{1}{2})\lambda$, an optical modulation section for modulating light flux emitted from the light source device in accordance with input image information to form an optical image, and a projection section for projecting the optical image formed by the optical modulation section.

According to this aspect of the invention, by adopting the light source device using the microwave electrodeless lamp described above as a light source, and preventing emission of the microwave energy, a safe projector with high light efficiency and high luminance can be provided.

BRIEF DESCRIPTION OF THE DRAWINGS

The invention will now be described with reference to the accompanying drawings, wherein like numbers refer to like elements.

FIGS. 5A and 5B are diagrams showing an example of a lamp structure according to the first embodiment of the invention, wherein FIG. 5A is a front view, and FIG. 5B is a plan view of a conductor.

DESCRIPTION OF EXEMPLARY EMBODIMENTS

Embodiments of the invention will hereinafter be explained with reference to the accompanying drawings.

Figure 4:
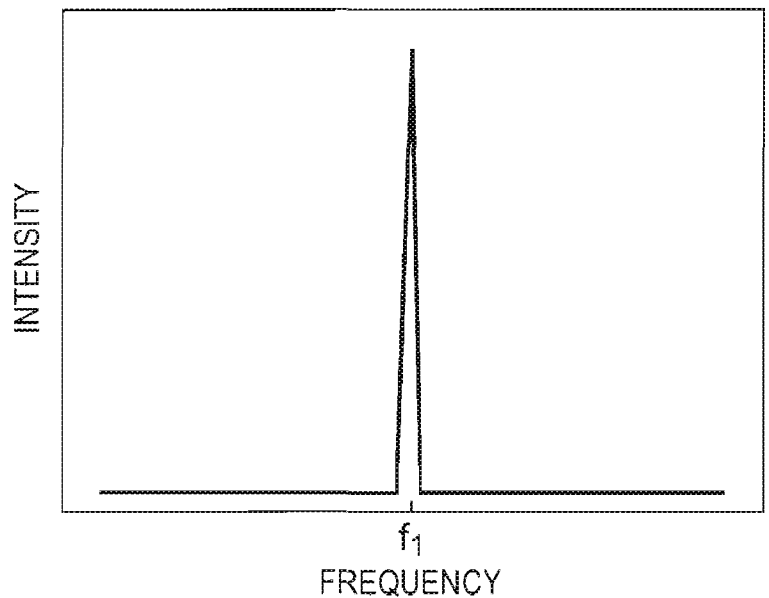
FIG. 4 is a graph showing a relationship between the frequency and the intensity of a signal output from, the diamond SAW oscillator according to the first embodiment of the invention.
Figure 5A:
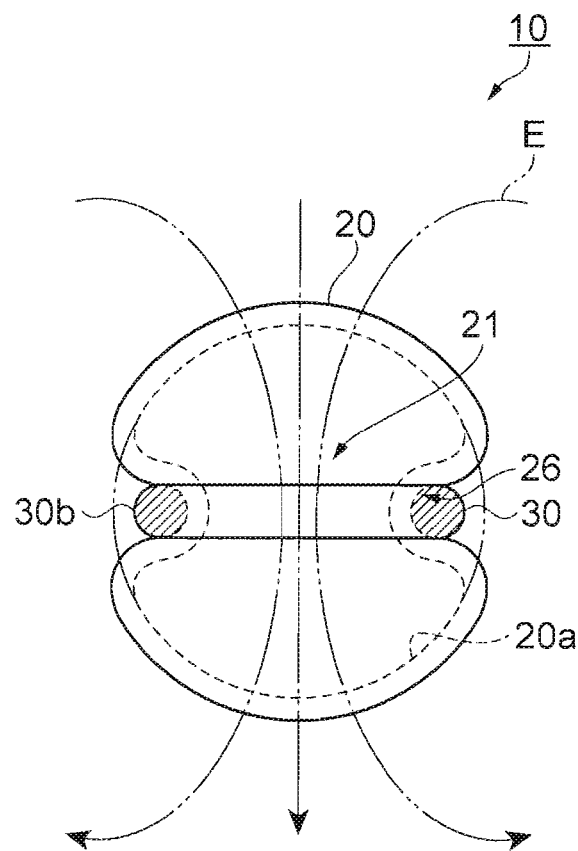
Figure 5B:
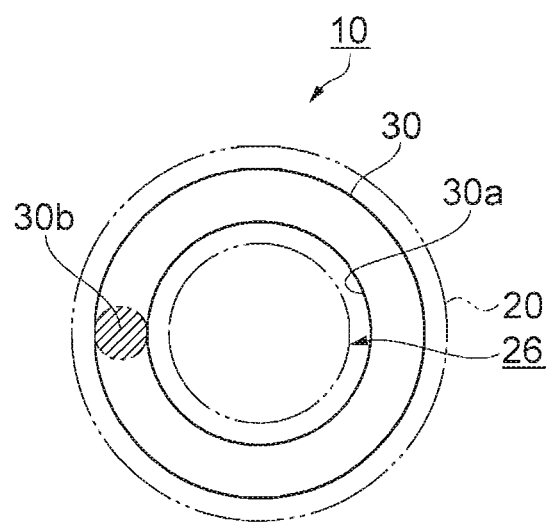
Figure 6:
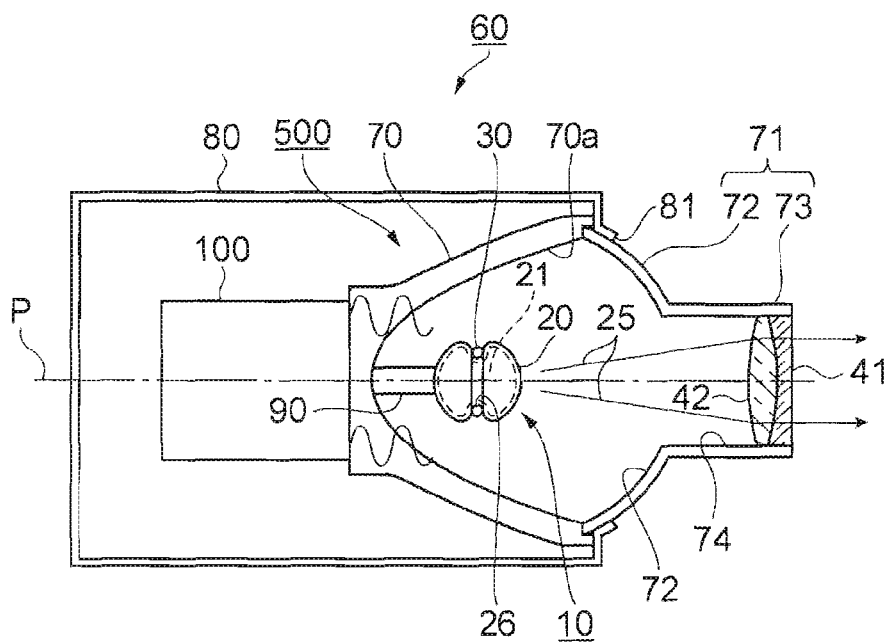
FIG. 6 is a cross-sectional view showing a schematic structure of a light source device according to a second embodiment of the invention.
Figure 7:
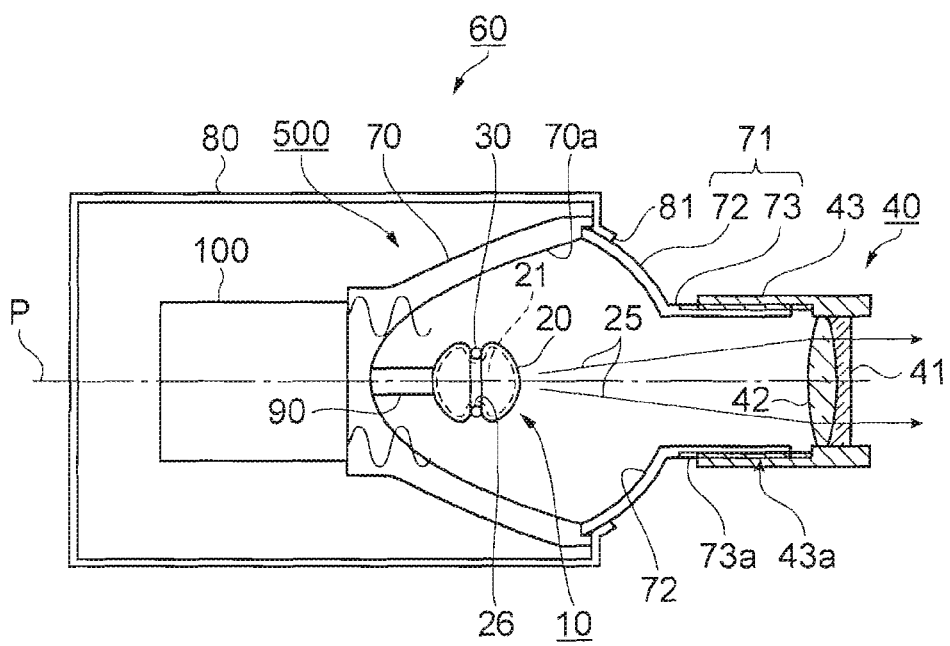
FIG. 7 is a cross-sectional, view showing a schematic structure of a light source device according to a third embodiment of the invention.
Figure 8:
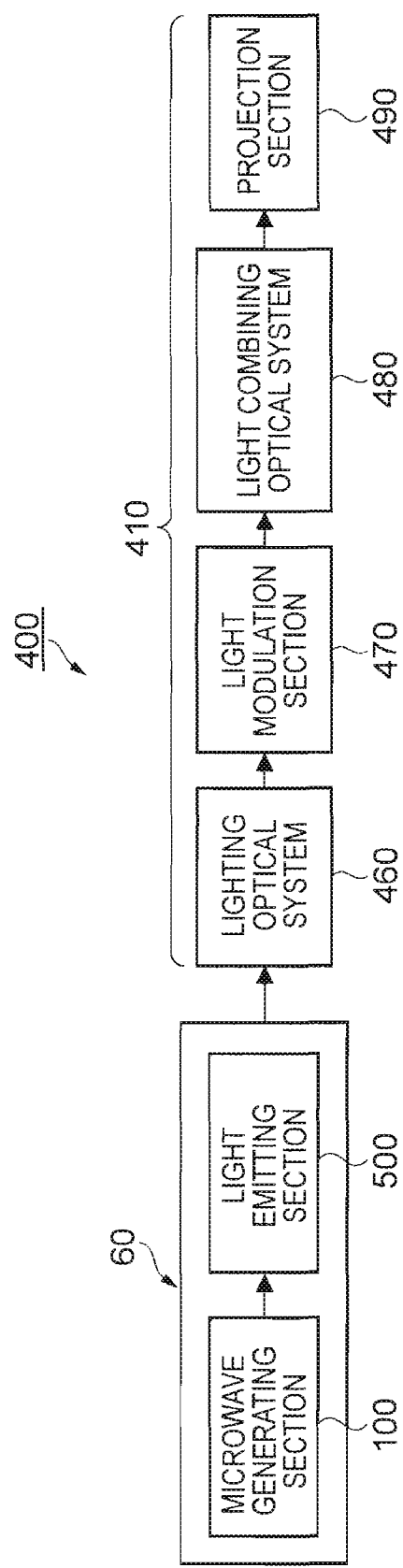
FIG. 8 is a block diagram showing a schematic configuration of a projector according to another embodiment of the invention.

FIGS. 1 through 4, 5A, and 5B show a light source device and a microwave electrodeless lamp according to a first embodiment of the invention, and FIGS. 6 through 8 show light source devices according to second and third embodiments, and a projector according to an embodiment of the invention, respectively.

First Embodiment

Figure 1:
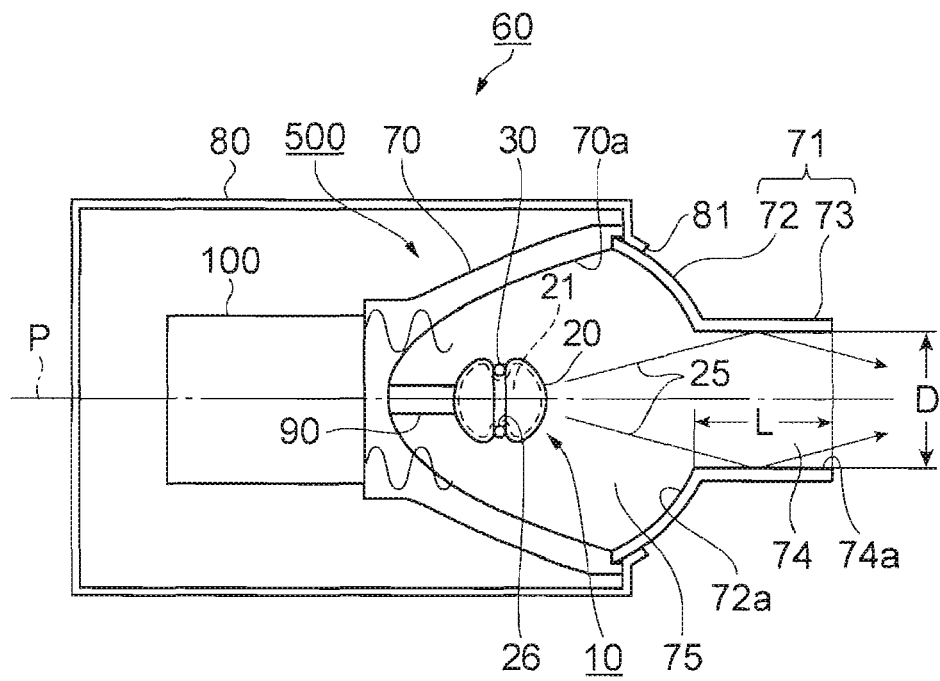
FIG. 1 is a cross-sectional view showing a schematic structure of a light source device according to a first embodiment of the invention.

FIG. 1 is a cross-sectional view showing a schematic structure of a light source device according to a first embodiment of the invention. In FIG. 1, a light source device 60 is configured including a microwave generating section 100, a light emitting section 500, and a light source housing 80 as a microwave blocking section for housing the microwave generating section 100 and the light emitting section 500. Further, the light emitting section 500 is configured having a microwave electrodeless lamp 10 (hereinafter also referred to simply as a lamp), a reflector 70, a metallic chamber 71 covering an opening section of the reflector 70, and a support section 90 for supporting the lamp 10.

The microwave generating section 100 is connected to the reflector 70 on the rear side thereof.

It should be noted that although a frequency commonly used as the microwave generally denotes a range from 3 GHz through 30 GHz, a range from 300 MHz through 30 GHz corresponding to the UHF band through the SHF hand is defined as the microwave band in the present embodiment of the invention.

The lamp 10 is disposed inside a cavity 75 composed of the chamber 71 and the reflector 70. The chamber 71 is composed of a chamber main body 72 having a curved surface of a spherical shape, and a tube member 73 having an opening section 74 for communicating the inside and the outside of the cavity 75 to lead a light flux emitted from the lamp 10 outside the chamber 71.

Here, assuming that the bore diameter of the opening section 74 of the tube member 73 is D, the length of the tube member is L, the wavelength of the microwave is $\lambda$, and the wavelength of the light is $\Lambda$, it is arranged that the bore diameter D satisfies $\Lambda<D\leq(\frac{1}{4})\lambda$, the length L satisfies $L\geq(\frac{1}{4})\lambda$, and $D+L=(\frac{1}{2})\lambda$ is also satisfied. $D=L=(\frac{1}{4})$ is more preferably satisfied.

It should be noted that although the structure of the chamber 71 having the chamber main body 72 and the tube member 73 formed integrally is exemplified in FIG. 1, the chamber main body 72 and the tube member 73 can be formed of separate members, or can be made of different kinds of materials.

Further, such configuration can also be possible that the tube member 73 penetrates the chamber main body 72 so that one end of the opening section 74 protrudes to the vicinity of the lamp 10, and the other end thereof protrudes in the direction towards the outside of the chamber main body 72.

The inside surface 72a of the chamber main body 72 and the inside surface 74a of the tube member 73 are finished as mirrors, and the spherical shape of the inside surface 72a of the chamber main body 72 is configured to have a focal point at a substantial center section of a light emitting area 21 of a center section of the lamp 10. The inside surface 72a reflects the microwave. Further, the inside surface 74a of the tube member 73 reflects a light flux 25 emitted by the lamp to lead the light flux 25 to the outside of the cavity 75.

It should be noted that the inside surface 72a of the chamber main body 72 can have a shape including a curved surface of a paraboloidal shape.

Further, although the shape of the inside surface 72a preferably has a curved surface of a paraboloidal shape in view of a convergent property of the light flux, it advantageously has a curved surface of a spherical shape in view of a simplicity in manufacture.

The reflector 70 is formed of quartz glass, and has a light flux reflecting surface 70a on the inner surface side thereof having a curved surface of a paraboloidal shape formed to face the outside surface of the lamp 10. The light flux reflecting surface 70a is formed of a dielectric multilayer film which transmits a microwave and reflects a light flux. Further, the paraboloidal shape of the light flux reflecting surface 70a is formed to have a focal point at the substantial center section of the light emitting area 21 of the lamp 10 disposed on the inner surface side of the reflector 70. It should be noted that the shape of the light flux reflecting surface 70a can include a curved surface of a spherical share.

Here, an open end section of the chamber 72 is engaged with an open end section of the reflector 70, thereby fixing the chamber 71 to the reflector 70, thus forming the cavity 75 as a microwave space.

The lamp 10 is composed of a transparent container 20 containing a light emitting material and a conductor 30 formed of a ring shaped conductive material disposed along the outer periphery of a recess 26 formed on an entire circumference of the transparent container 20 so as to protrude inside an enclosed space 21 (also referred to as the light emitting area 21). Further, the lamp 10 is fixed on an inside bottom of the reflector 70 with a support section 90. It should be noted that the detailed structure of the lamp 10 will be explained with reference to FIGS. 5A and 5B described later.

The support section 90 is formed of a rod-like quartz glass having one end bonded with the transparent container 20 of the lamp 10 at a convex area thereof substantially perpendicular to a circumferential plane of the conductor 30 and the other end supported by and fixed to the reflector 70. Thus, the lamp 10 is supported at a predetermined position on the inner surface side of the reflector 70, and fixed to the reflector 70 in a form of protruding to the inner surface side of the cavity 75.

The light source housing 80 is provided for preventing that the microwave leaks outside the light source device 60 to exert a harmful influence on a human body surrounding electronic apparatuses, and so on. Therefore, the light source housing 80 is formed of a conductive material (e.g., a metal material) blocking a microwave.

Further, in the light source housing 80, a hole section 81 having a substantially circular shape is formed on the side of the surface opposed to the chamber 71, and the peripheral edge of the hole section 81 is formed to have an inside surface with a curved surface similar to the outer surface of the open end section of the chamber 71. Thus, the light source housing 80 fixes the chamber 71 by fitting the open end section of the chamber 71 to the hole section 81. Therefore, the light source device 60 has a form in which the tube member 73 protrudes from the light emitting section 500 to the outside of the light source housing 80. Further, the light source housing 80 houses the microwave generating section 100 and the light emitting section 500. In the present embodiment, the light source housing 80 and the chamber 71 prevent the microwave from leaking from the light source device 60.

It should be noted that the light source housing 80 can also be netted or formed to have a plurality of apertures with diameters no greater than a quarter of the wavelength of the microwave. Further, the light source housing 80 can be formed of other materials with which it can have a configuration for blocking the microwave.

The microwave generating section 100 generates a radio frequency signal and emits the signal as a microwave towards the chamber 71 (the configuration of the microwave generation section 100 will be described in detail later). The microwave thus emitted is a substantial plane wave and proceeds through the light flux reflecting surface 70a of the reflector 70 in a direction towards the charger 71. The microwave arriving at the chamber 71 is reflected by the inside surface 72a, and the microwave thus reflected is collected to the light emitting area 21 at the center section of the lamp 10. The light emitting material encapsulated in the light emitting area 21 is excited (and ionized) in the light emitting area 21 by the microwave collected to the light emitting area 21 to cause plasma emission of the light emitting material, thereby the light emitting area 21 emits light.

When the light emitting area 21 of the lamp 10 emits light, the light flux is emitted. A part of the light flux thus emitted reaches the light flux reflecting surface 70a of the reflector 70 and is reflected by the light flux reflecting surface 70a. In the present embodiment, the light flux reflected by the light flux reflecting surface 70a becomes a parallel light flux substantially parallel to the light axis P (illustrated the drawing with a dashed line). Further, there is also a light flux 25 input inside the opening section 74 of the tube member 73 directly from the lamp. Further, such a light flux is lead outside the tube member 73 while being reflected by the inside surface 74a of the tube member 73.

The configuration of the microwave generating section will now be explained with reference to the accompanying drawings.

Figure 2:
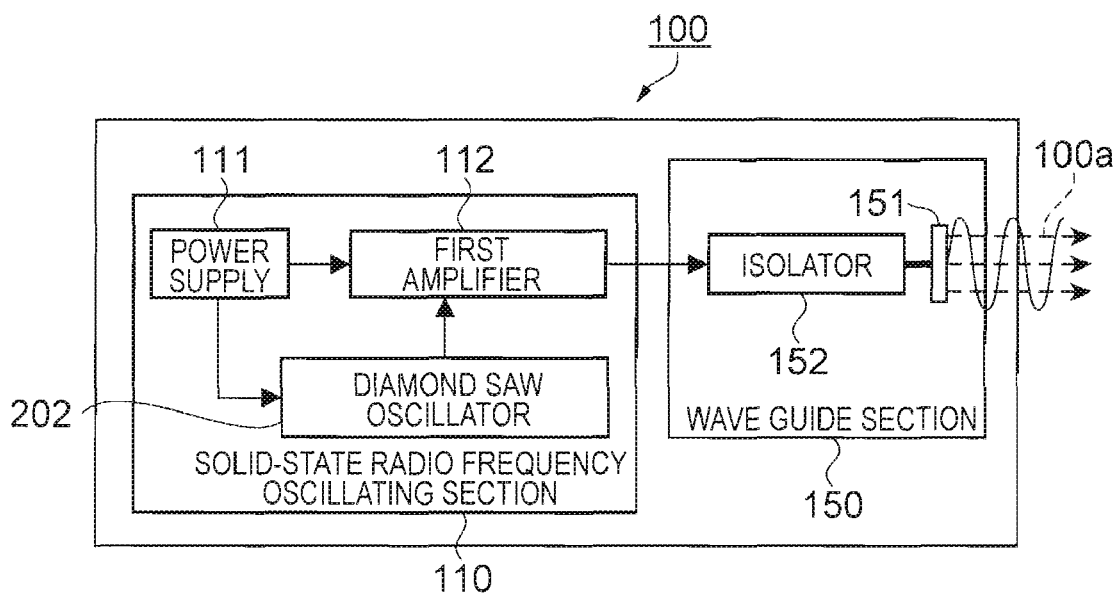
FIG. 2 is a block diagram showing a schematic configuration of a microwave generating section according to the first embodiment of the invention.

FIG. 2 is a block diagram showing a schematic configuration of the microwave generating section. In FIG. 2, the microwave generating section 100 is composed of a solid-state radio frequency oscillating section 110 for outputting a radio frequency signal and a wave guide section 150 for emitting the radio frequency signal, which is output from the solid-state radio frequency oscillating section 110 as the microwave.

The solid-state radio frequency oscillating section 110 is configured having a power supply 111, a Surface Acoustic Wave (SAW) oscillator as a solid-state radio frequency oscillator, and a first amplifier 112. In the present embodiment, a diamond SAW oscillator 202 is adopted as the surface acoustic wave oscillator. The wave guide section 150 is composed having an antenna 151 and an isolator 152 as a safety component.

The solid-state radio frequency oscillating section 110 will now be explained in detail. The power supply 111 supplies the diamond SAW oscillator 202 and the first amplifier 112 with electricity. A posterior stage of the diamond SAW oscillator 202 is connected to an anterior stage of the first amplifier 112. Further, the radio frequency signal output from the diamond SAW oscillator 202 is amplified by the first amplifier 112 and then output therefrom. The radio frequency signal output from the first amplifier 112 is output from the solid-state radio frequency oscillating section 110 as the radio frequency signal. In the present embodiment there is output from the solid-state radio frequency oscillating section 110 the radio frequency signal (2.45 GHz band in the present embodiment) amplified to be a radio frequency wave output level for exciting the light emitting material encapsulated in the lamp 19 to emit light.

Hereinafter, the wave guide section 150 will be explained in detail. The wave guide section 150 is for guiding the radio frequency wave output from the solid-state radio frequency oscillating section 110 to output it as a microwave 110a, and is provided with the antenna 151 for emitting the microwave 100a and the isolator 152 as a counter measure to the reflected wave.

The antenna 151 is configured as a patch antenna in the present embodiment, and forms a plane antenna for emitting a microwave with unidirectionality. The microwave 100a, which is a substantial plane wave, can be emitted by the antenna 151.

The isolator 152 is disposed between the first amplifier 112 and the antenna 151 on the posterior stage of the first amplifier 112. Therefore, the isolator 152 prevents the reflected wave from the chamber 71, the lamp 10, the light source housing 80, and so on to be the targets as a result of emission of the microwave 100a from the antenna 151 from returning to the solid-state radio frequency oscillating section 110, thereby preventing failure of the first amplifier 112 and so on caused by the reflected wave.

Subsequently, the diamond SAW oscillator will be explained with reference to the drawings.

Figure 3:
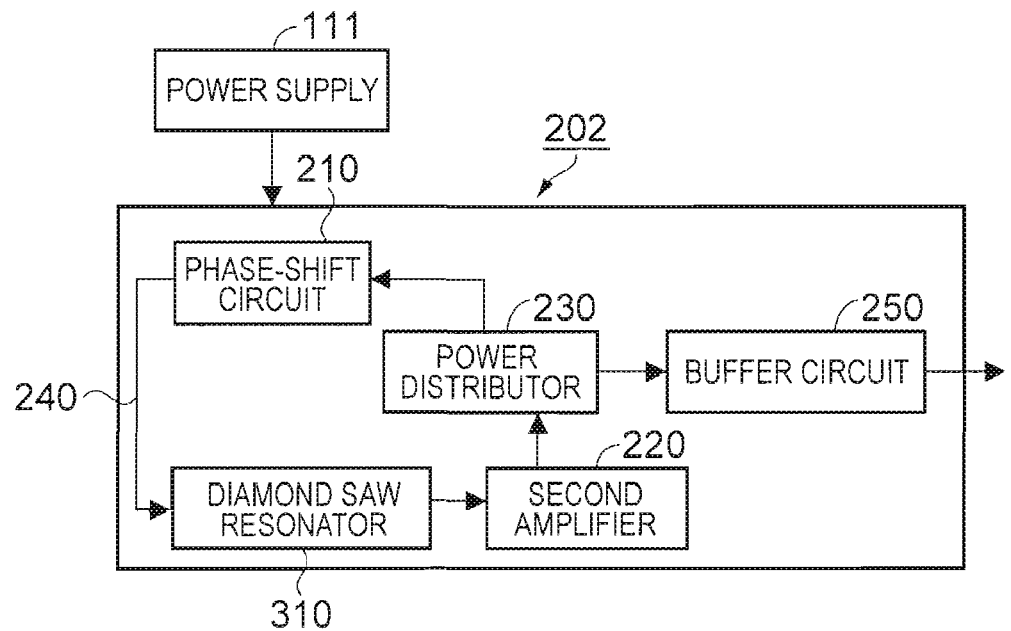
FIG. 3 is a block diagram showing a schematic configuration of a diamond SAW oscillator as a solid-state radio frequency oscillator according to the first embodiment of the invention.

FIG. 3 is a block diagram showing a schematic configuration of the diamond SAW oscillator as a solid-state radio frequency oscillator. In FIG. 3, the diamond SAW oscillator 202 has a configuration in which a phase-shift circuit 210, a diamond SAW resonator 310, a second amplifier 220, and a power distributor 230 form a loop circuit 240, and a buffer circuit 250 is connected to one output side of the power distributor 230.

The phase-shift circuit 210 is for varying the phase of the loop circuit 240 by inputting a control voltage from the power supply 111. These blocks are connected to each other by a matched connection with a predetermined characteristic impedance of specifically 50Ω. It should be noted that the diamond SAW resonator 310 is connected to an input side of the second amplifier 220 so that an input voltage with which the second amplifier 220 becomes a saturated state is supplied thereto.

Thus, the direct oscillation of the radio frequency wave signal in the GHz band becomes possible using the diamond SAW resonator 310. Further, the output power of the second amplifier 220 can be output from the power distributor 230 to the outside via the buffer circuit 250 while keeping the matched conditioner.

Further, according to this circuit configuration, it becomes possible to continue the continuous oscillation condition with minimum power applied to the diamond SAW resonator 310. Further, it becomes possible to execute frequency modulation on the radio frequency signal by the phase-shift circuit 210, thus it becomes possible to vary and adjust the frequency of the microwave to the lamp 10. It should be noted that the use of the phase-shift circuit 210 can be eliminated, and in that case, the solid-state radio frequency oscillator becomes a solid-state oscillator oscillating at a frequency uniquely determined by the characteristic of the diamond SAW resonator 310.

Subsequently, the characteristic of the signal output from the diamond SAW oscillator will be explained with reference to the drawings.

FIG. 4 is a graph snowing a relationship between the frequency and the intensity of the signal output from the diamond SAW oscillator. In FIG. 4, the horizontal axis represents the frequency, and the vertical axis represents the intensity of the output signal.

The diamond SAW oscillator 202 outputs only a radio frequency wave signal (GHz band) with a specified frequency $f_1$. Further, a steep direct oscillation as shown in FIG. 4 can be obtained. In the present embodiment, the radio frequency wave signal with the specified frequency $f_1$ in the 2.45 GHz band is output. Since the steep direct oscillation can be obtained, quick lighting or quick extinction of the lamp 10 becomes possible.

Subsequently, a structure of the lamp 10 used for the light source device 60 according to the present embodiment will be explained with reference to the drawings.

FIGS. 5A and 5B are diagrams showing an example of a lamp structure according to the first embodiment of the invention, wherein FIG. 5A is a front view, and FIG. 53 is a plan view (viewed from the upper position of FIG. 5A) of a conductor. In FIGS. 5A and 5B, the lamp 10 is composed of the transparent container 20 made of a nonconductive material and the conductor 30 with a ring shape disposed along the outer periphery of the recess 26 formed on an entire circumference of the transparent container 20 so as to protrude inside an enclosed space 21.

The transparent container 20 is made of a nonconductive material such as quartz glass or transparent ceramics. The transparent container 20 is provided with the enclosed space 21 (also referred to as the light emitting area 21) filled with the light emitting material for emitting light by a microwave. Further, the recess 26 is formed on an entire circumference of the transparent container 20. Thus, the transparent container 20 has a substantially gourd-like shape constricted by the recess 26, and the inside surface of the recess 26 has a depth so large as to protrude inward from the spherical area 20a of most of the enclosed space 21.

As the conductor 30, there is used a material with a small thermal expansion coefficient and high heat resistance. Specifically, a tungsten alloy or a stainless alloy is suitable therefor. Although the cross-section 30b of the conductor 30 has a circular shape in FIGS. 5A and 5B, the cross-sectional shape is not limited to be circular but can be elliptic or rectangular. Further, the inside surface 30a of the conductor 30 can be adhered to the outer circumference of the recess 26 or spaced therefrom. In the case in which they are spaced, the size should be determined so that the inside surface 30a enters further inward than the spherical area 20a of most of the enclosed space 21.

Since the lamp 10 configured as described above is in the condition (the condition of no power supply) in which the conductor 30 is electrically separated, the lamp 10 in the present embodiment of the invention has an electrodeless structure without an electrode.

It should be noted that the transparent container 20 can be formed manufacturing a hollow spherical body, then heating it to the temperature at which it can be deformed, and band-tightening with a band having a cross-sectional shape of the recess 26. Further, in the case in which a difference between the outside diameter of the transparent container 20 and the inside diameter of the conductor 30 is small, the conductor 30 can be pressed into the transparent container 20. In this case, shrink-fit can be used by heating the conductor 30.

The encapsulation of the light emitting material can be performed by providing a small through hole (not shown) to the transparent container 20, filling the enclosed space 21 with the light emitting material, and then sealing it with a sealing member.

Further, as the light emitting material to be encapsulated in the enclosed space 21, a noble gas such as neon, argon, krypton, and xenon, and besides these gasses, mercury and a metal halide can be sited.

The lamp 10 is integrated in the condition in which the conductor 30 is fitted to the recess 26 of the transparent container 20, and is fixed to the reflector 70 with the support section 90 (see FIG. 1).

The conductor 30 is provided for concentrating the electric field component of the microwave when the irradiation with the microwave is performed, has a role equivalent to the antenna placed in an electromagnetic field, and is provided for concentrating (illustrated with a chain double-dashed line E in the drawing) the electric field component of the microwave into the center section of the conductor 30 to improve the emission efficiency of the lamp. Therefore, since the electric field component is further concentrated in the center section area of the conductor 30, the light emission intensity increases thus obtaining light emission similar to a point source.

Therefore, according to the first embodiment described above, the tube member 73 communicating the inside and outside of the cavity 75 is provided to the chamber 71, and the bore diameter D of the opening section 74 of the tube member 73 is set to satisfy $\Lambda < D$, thus the light flux emitted from the lamp 10 is led from the tube member 73 to the outside of the cavity 75 to satisfy $D \leq (\frac{1}{4})\lambda$, thereby the intense electric field caused by the microwave, namely emission of the microwave energy can be prevented.

Further, since the length L of the tube member 73 is set to satisfy $L \geq (\frac{1}{4})\lambda$ and further $D+L=(\frac{1}{2})\lambda$, the length L of the tube member 73 becomes $L=(\frac{1}{2})\lambda$ at a maximum, thus the optical loss of the light flux from the lamp 10 led out through the tube member 73 is reduced and the light source device 60 with high light efficiency can be realized.

Further, since no light flux reflected by the meshed metal section exists in contrast to the structure using the meshed metal as in the Document 1 described above, deterioration of the light efficiency never occurs. Further, there can be obtained an advantage that deterioration in the structural strength of the chamber 71 caused by the heat radiation from the lamp 10 is eliminated.

Further, when setting the bore diameter D of the opening section of the tube member 73 to $(\frac{1}{4})\lambda$ and the length L of the tube member to $(\frac{1}{4})\lambda$, the electrical equivalent length viewed from the chamber 71 becomes $D+L=(\frac{1}{2})\lambda$, which is equivalent to the case with a short circuit inserted therein. Therefore, leakage of the microwave to the outside through the tube member 73 can be prevented, thus the light flux can be output with high efficiency.

Further, since the light flux emitted from the lamp 10 is led out while being reflected by the inside surface 74a of the tube member 73, the optical loss in the light flux reflection can be prevented by forming the inside surface 74a of the tube member 73 as a mirror finished surface.

Second Embodiment

Subsequently, a light source device according to a second embodiment of the invention will be explained with reference to the drawings. The second embodiment is characterized in that optical lenses are provided to the tube member of the chamber. Other sections are the same as in the first embodiment described above, and the explanations therefor are omitted or provided with the same reference numerals as in the first embodiment.

FIG. 6 is a cross-sectional view showing a schematic structure of a light source device according to the second embodiment of the invention. In FIG. 6, the opening section 74 of the tube member 73 of the chamber 71 is provided with optical lenses 41, 42 attached thereto. The optical lenses 41, 42 are fixed to the inside of the tube member 73 with an adhesive having a heat-resisting property or the like.

The exemplified optical lenses 41, 42 are respectively a concave lens and a convex lens, and the light flux 25 is collected or converted into a parallel light flux by the combination of these lenses. It should be noted that the configuration of these lenses is not limited to the combination shown in FIG. 6, but various kinds and shapes of optical lenses can freely be combined correspondingly to the purpose of use.

By thus providing the optical lenses 41, 42 to the tube member 73, the light guiding distance from the lamp 10 as the light source to the optical lenses can be shortened, thus the light efficiency can further be improved. As the optical lenses, condenser lenses, collimating lenses, and so on can be adopted, thus the light flux can be collected or parallelized at the light flux exit of the light source device 60, thereby obtaining an advantage of increasing freedom of designing the optical system.

Third Embodiment

Subsequently, a third embodiment of the invention will be explained with reference to the drawings. The third embodiment of the invention is characterized in that the optical lenses provided in the second embodiment described above are formed as a unit, and then attached to the tube member. Other sections are the same as in the second embodiment described above, and the explanations therefor are omitted or provided with the same reference numerals as in the second embodiment.

FIG. 7 is a cross-sectional view showing a schematic structure of a light source device according to the third embodiment of the invention. In FIG. 7, the tube member 73 of the chamber 71 is provided with an optical lens unit 40 attached thereto. The optical lens unit is composed of the optical lenses 41, 42 fixed to a lens holder 43 shaped like a tube.

As a method of fixing the optical lenses 41, 42 to the lens holder 43, there are cited a method with an adhesive having a heat-resisting property, a method of forming a concave section and a convex section inside a tube of the lens holder 43 and fitting the optical lenses 41, 42 into the concave section and the convex section to fix them, and so on.

The lens holder 43 is provided with an internal thread 43a formed on the engaging section with the tube member 73, and the tube member 73 is provided with an external thread 73a formed on the outer circumference thereof, thus the optical lens unit 40 and the tube member 73 are screwed to be fixed to each other. In such a screw fixing structure, the optical lens unit 40 can be moved along the optical axis P. In other words, the optical lens unit 40 can be fixed at an arbitrary position in the direction of the optical axis P of the light flux. After screwing the optical lens unit 40 to a desired position, the optical lens unit 40 can be fixed with an adhesive or the like, or with a separate lateral screw (fixing screw) provided additionally.

Further, as a modification of the structure shown in FIG. 7, there can be adopted a structure in which the outside diameter of the lens holder 43 is formed smaller than the inside diameter of the tube member 73, the external thread is provided on the outer circumference section of the lens holder 43, and the internal thread is provided on the inner periphery of the tube member 73, thus the optical lens unit 40 is attached inside the tube member 73. In the case with such a structure, the light flux reflecting surface of the inner surface of the lens holder is preferably finished to be in the mirror surface condition.

As described above, the third embodiment of the invention relates to the structure in which the optical lens unit 40 is formed by attaching the optical lenses 41, 42 to the tube like lens holder 43, and the optical lens unit 40 is then attached to the tube member 73. According to this configuration by preparing a plurality of kinds of optical lens units 40 for respective purpose of use such as collecting the light flux emitted from the lamp 10 or collimating the light flux, it is possible to use the plurality of kinds of optical lens units in combination in one kind of light source device in accordance with the purpose of use as in the case with a single-lens reflex camera.

Further, by movably attaching the optical lens unit 40, freedom of setting the focal distance increases, thus instead of providing dedicated light source devices to individual forms of use, it becomes possible to cope with various kinds of forms of use without increasing the number of kinds of light source devices.

Projector

Subsequently, a projector applying the light source device 60 described above will be explained with reference to the drawings.

FIG. 8 is a block diagram showing a schematic configuration of the projector according to an embodiment of the invention. In FIG. 8, the projector 400 is composed of the light source device 60 described above and an optical system 410.

The optical system 410 is configured including a lighting optical system 460, a light modulation section 470, a light combining optical system 480, and a projection section 490. Further, the light source device 60 is configured including the microwave generating section 100 and a light emitting section 500.

The operation of the projector 400 will hereinafter be explained. The microwave generating section 100 emits a microwave, and the light emitting section 500 emits light in response to the microwave emitted from the microwave generating section 100. Further, the lighting optical system 460 equalizes the light intensity of the light flux emitted from the light source device 60, and separates the light flux into colors of light.

The light modulating section 470 performs modulation on the light flux of each colored light separated by the lighting optical system 460 in accordance with image information, thereby forming an optical image. The color combining optical system 480 combines the optical images of respective colored light on which the lighting optical system 460 executes the color separation and the light modulation section 470 executes the modulation, and the projection section 490 projects the optical images. Here, the light source housing 80 (see FIG. 1) is provided to the light source device 60 for blocking the microwave and at the same time for forming the microwave generating section 100 and the light emitting section 500 as a unit.

Since the light source device 60 described above is implemented, the projector 430 according to the embodiment of the invention can quickly put on the lamp and in addition the lamp rises with high luminance, thus the wait time from operation of the switch to when a picture can be projected with a predetermined luminance can dramatically be shortened in comparison with a projector equipped with a lighting device using the discharge lamp in the related art.

Further, the time necessary for extinction can also be shortened, and it becomes possible to repeat lighting and extinction in a short period of time, thus obtaining an advantage of enhancing convenience.

Further, since the lamp 10 implemented therein is a microwave electrodeless lamp, the life of the light source device 60 can be extended in comparison with the projector equipped with a lighting device using the discharge lamp in the related art, thus the burden of replacing the light source device can be reduced, and an economic effect can be enhanced.

Further, by adopting the light source device 60 described above, a projector which is safe, has high light efficiency and high luminance while preventing emission of the microwave energy to the outside of the light source device 60 can be provided.

The entire disclosure of Japanese Patent Application No. 2007-023822, filed Feb. 2, 2007 is expressly incorporated by reference herein.

What is claimed is:

1. A light source device comprising:
   a microwave generating section for generating a microwave;
   a reflector connected to the microwave generating section; and
   a microwave electrodeless lamp disposed inside a cavity, the cavity including the reflector and a metallic chamber covering an opening section of the reflector,
   wherein the chamber includes a tube member having an opening section for communicating the inside and the outside of the cavity to lead a light flux out of the chamber, and
   a bore diameter D of the opening section, a length L of the tube member, a wavelength $\lambda$ of the microwave, and a wavelength $\Lambda$ of the light flux satisfy $\Lambda < D \leq (1/4)\lambda$, $L \geq (1/4)\lambda$, and $D + L = (1/2)\lambda$.

2. The light source device according to claim 1,
   wherein the bore diameter D of the opening section is equal to $(1/4)\lambda$, and the length L of the tube member is equal to $(1/4)\lambda$.

3. The light source device according to claim 1,
   wherein at least inner surface of the tube member of the chamber is in a mirror surface condition.

4. The light source device according to claim 1,
   wherein the tube member is provided with an optical lens on an optical axis of a light flux emitted from the microwave electrodeless lamp.

5. The light source device according to claim 4,
   wherein the optical lens is attached to a tube like lens holder to form an optical lens unit, and
   the optical lens unit is attached to the tube member.

6. The light source device according to claim 5,
   wherein the optical lens unit is attached movably in the optical axis direction of the light flux emitted from the microwave electrodeless lamp.

7. A projector comprising:
   a light source device including
      a microwave generating section for generating a microwave,
      a reflector connected to the microwave generating section, and
      a microwave electrodeless lamp disposed inside a cavity, the cavity including the reflector and a chamber covering an opening section of the reflector,
      the chamber including a tube member having an opening section for communicating the inside and the outside of the cavity to lead a light flux out of the chamber, and
      a bore diameter D of the opening section, a length L of the tube member, a wavelength $\lambda$ of the microwave, and a wavelength $\Lambda$ of the light flux satisfying $\Lambda < D \leq (1/4)\Lambda$, $L \geq (1/4)\lambda$, and $D + L = (1/2)\lambda$;
   an optical modulation section for modulating light flux emitted from the light source device in accordance with input image information to form an optical image; and
   a projection section for projecting the optical image formed by the optical modulation section.

* * * * *